(12) United States Patent
Kobori (10) Patent No.: US 9,507,541 B2
(45) Date of Patent: Nov. 29, 2016

(54) COMPUTATION DEVICE, COMPUTATION METHOD, AND MEDIUM (71) Applicant: NEC CORPORATION, Tokyo (JP)

(72) Inventor: Tomoyoshi Kobori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/654,876

(22) PCT Filed: Dec. 16, 2013

(86) PCT No.: PCT/JP2013/007383
§ 371 (c)(1),
(2) Date: Jun. 23, 2015

(87) PCT Pub. No.: WO2014/103235
PCT Pub. Date: Jul. 3, 2014

(65) Prior Publication Data
US 2015/0347056 A1 Dec. 3, 2015

(30) Foreign Application Priority Data

Dec. 25, 2012 (JP) ................. 2012-281060

(51) Int. Cl.
G06F 13/12 (2006.01)
G06F 3/06 (2006.01)
(Continued)

(52) U.S. Cl.
CPC ........... *G06F 3/0647* (2013.01); *G06F 3/0608* (2013.01); *G06F 3/0683* (2013.01); *G06F 7/76* (2013.01); *G06F 9/34* (2013.01); *G06F 9/38* (2013.01); *G06F 12/00* (2013.01); *G06F 12/06* (2013.01); *G06F 15/167* (2013.01);
(Continued)

(58) Field of Classification Search
None
See application file for complete search history.

(56) References Cited

U.S. PATENT DOCUMENTS 7,219,172 B1 * 5/2007 Wewel ................. G06F 3/0616
710/244
2002/0103839 A1 8/2002 Ozawa
(Continued)

FOREIGN PATENT DOCUMENTS

JP 58-181168 A 10/1983
JP 4-503720 A 7/1992
(Continued)

OTHER PUBLICATIONS

International Search Report of PCT/JP2013/007383, dated Mar. 11, 2014. [PCT/ISA/210], English Translation.
(Continued)

*Primary Examiner* — Henry Tsai
*Assistant Examiner* — Aurangzeb Hassan
(74) *Attorney, Agent, or Firm* — Sughrue Mion, PLLC (57) ABSTRACT A computation device according to the present invention includes: a first data storage unit that stores operation target data; an operation processing unit that executes an operation by using data; a data permutation unit that selects indicated data among the operation target data stored in the first data storage unit and data operated by the operation processing unit, provides predetermined delay for data received a delay indication among the indicated data based on a parameter, does not delay data not received a delay indication, executes permutation of indicated data based on a parameter, and outputs data operated in the operation processing unit and operation result data of the operation processing unit; and second data storage unit that stores the operation result data output by the data permutation unit.

6 Claims, 8 Drawing Sheets (51) Int. Cl.
    *G06F 12/00*       (2006.01)
    *G06F 12/06*       (2006.01)
    *G06F 7/76*         (2006.01)
    *G06F 15/167*     (2006.01)
    *G06F 15/80*       (2006.01)
    *G06F 9/34*         (2006.01)
    *G06F 9/38*         (2006.01)

(52) U.S. Cl.
    CPC .............. *G06F 15/80* (2013.01); *G06F 3/067* (2013.01); *G06F 3/0607* (2013.01); *G06F 3/0689* (2013.01)

(56) References Cited

U.S. PATENT DOCUMENTS

| | | |
|---|---|---|
| 2003/0184339 A1 | 10/2003 | Ikeda et al. |
| 2006/0010306 A1* | 1/2006 | Saito .................. G06F 15/8007 712/226 |
| 2006/0294332 A1* | 12/2006 | McClure ............... G06F 3/0617 711/167 |
| 2009/0327655 A1 | 12/2009 | Yoshikawa et al. |
| 2010/0122071 A1 | 5/2010 | Yoshikawa et al. |
| 2012/0047511 A1* | 2/2012 | Grusy .................... G06F 3/061 718/104 |
| 2012/0278373 A1 | 11/2012 | Kobayashi et al. |

FOREIGN PATENT DOCUMENTS

| | | |
|---|---|---|
| JP | 2002-215603 A | 8/2002 |
| JP | 2006-31127 A | 2/2006 |
| JP | 2009-282781 A | 12/2009 |
| JP | 2010-9247 A | 1/2010 |
| JP | 2010-117806 A | 5/2010 |
| WO | 2011/036918 A1 | 3/2011 |

OTHER PUBLICATIONS

Communication dated Aug. 23, 2016 from the European Patent Office in counterpart application No. 13867312.4.

* cited by examiner

United States Patent

COMPUTATION DEVICE, COMPUTATION METHOD, AND MEDIUM

CROSS REFERENCE TO RELATED APPLICATIONS

This application is a National Stage of International Application No. PCT/JP2013/007383 filed Dec. 16, 2013, claiming priority based on Japanese Patent Application No. 2012-281060, filed Dec. 25, 2012, the contents of all of which are incorporated herein by reference in their entirety.

TECHNICAL FIELD

The present invention relates to a computation device including a plurality of operation processing units (processors), and in particular, to a computation device that permutes data.

BACKGROUND ART

Signal processing handles a large amount of continuous data (stream data) as operation target data. In many cases, the signal processing repeatedly executes the same processing (an operation realized using a plurality of commands) for the large amount of data.

As one processor architecture for efficiently processing a large amount of data, an array processor is available.

Figure 7:
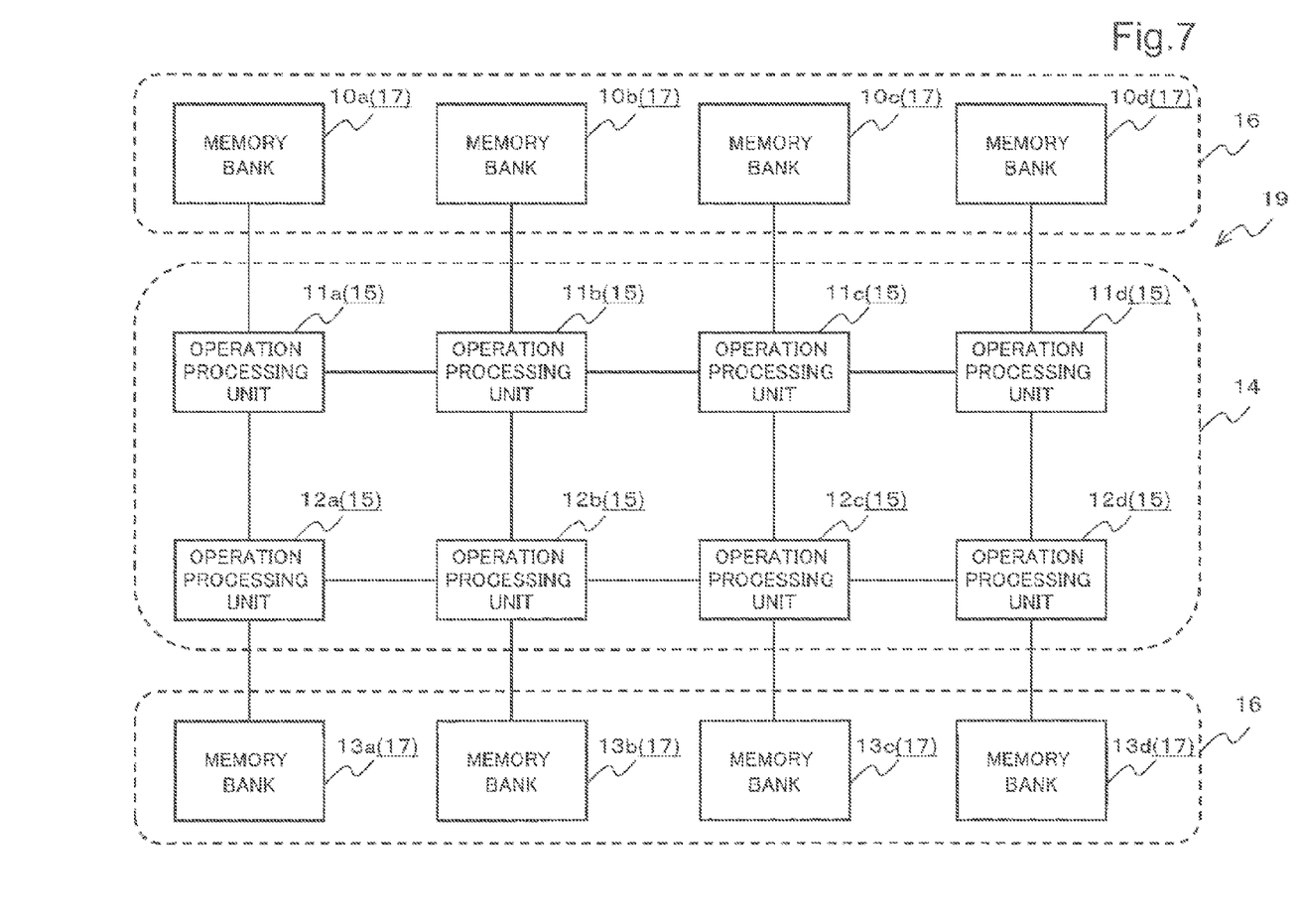
FIG. 7 is a block diagram illustrating a configuration of a general array processor.

FIG. 7 is a block diagram illustrating an example of a configuration of a general array processor 19.

The array processor 19 illustrated in FIG. 7 includes an array operation unit 14 in which a plurality of operation processing units 11a to 11d (hereinafter, collectively referred to as an operation processing unit 11) and a plurality of operation processing units 12a to 12d (hereinafter, collectively referred to as an operation processing unit 12) are disposed in an arrayed manner (in the following description, the respective operation processing units, that is, the operation processing unit 11 and the operation processing unit 12, included in the array operation unit 14, will be collectively referred to as an operation processing unit 15).

Further, the array processor 19 includes a data memory 17 including memory banks 10a to 10d (hereinafter, collectively referred to as a memory bank 10) and memory banks 13a to 13d (hereinafter, collectively referred to as a memory bank 13) connected with the array operation unit 14 (in the following description, the memory bank 10 and the memory bank 13 will be collectively referred to as a multi-bank 16).

The operation processing unit 15 disposed in an arrayed manner is connected with a neighboring operation processing unit 15. Between the operation processing units 15, wiring is connected in a meshed manner. Each connection is controlled by a switch disposed on an input stage of the operation processing unit 15. Operation target data is stored in the memory bank 10 and the memory bank 13 of the multi-bank 16 connected with the array operation unit 14.

The array operation unit 14 differs in parallelism and a degree of flexibility toward operation processing, depending on the internal connection configuration. In the array processor 19 illustrated in FIG. 7, the operation processing unit 15 is connected with a neighboring operation processing unit 15 as illustrated in FIG. 7.

The array processor 19 executes predetermined processing by causing a plurality of operation processing units 15 to be cooperative. Therefore, when timings of data input after reaching the operation processing unit 15 are different, it is difficult for the array processor 19 to appropriately execute an operation in some cases.

In FIG. 7, for example, description is made with attention to the operation processing unit 12b. It is assumed that an operation of the operation processing unit 12b needs operation results of the operation processing unit 11b and the operation processing unit 12a. In this case, when execution timings of operations of the operation processing unit 11b and the operation processing unit 12a are different, input timings of the respective operation results to the operation processing unit 12b from the operation processing unit 11b and the operation processing unit 12a become different based on the timings. In the same manner, when delays of operation outputs of the operation processing unit 11b and the operation processing unit 12a are different, input timings of the respective operation results to the operation processing unit 12b from the operation processing unit 11b and the operation processing unit 12a become different based on the delay difference. A time equivalent to this timing difference becomes a wasted time.

Concurrent operations of as many operation processing units 15 as possible during operation processing of the array processor 19 become a point for enhancing operation efficiency of the array processor 19. Therefore, a way how synchronization control between the operation processing units 15 is configured is important for enhancing operation efficiency of the array processor 19.

Therefore, a synchronization mechanism for data is being used (refer to, for example, PTL 1).

Figure 8:
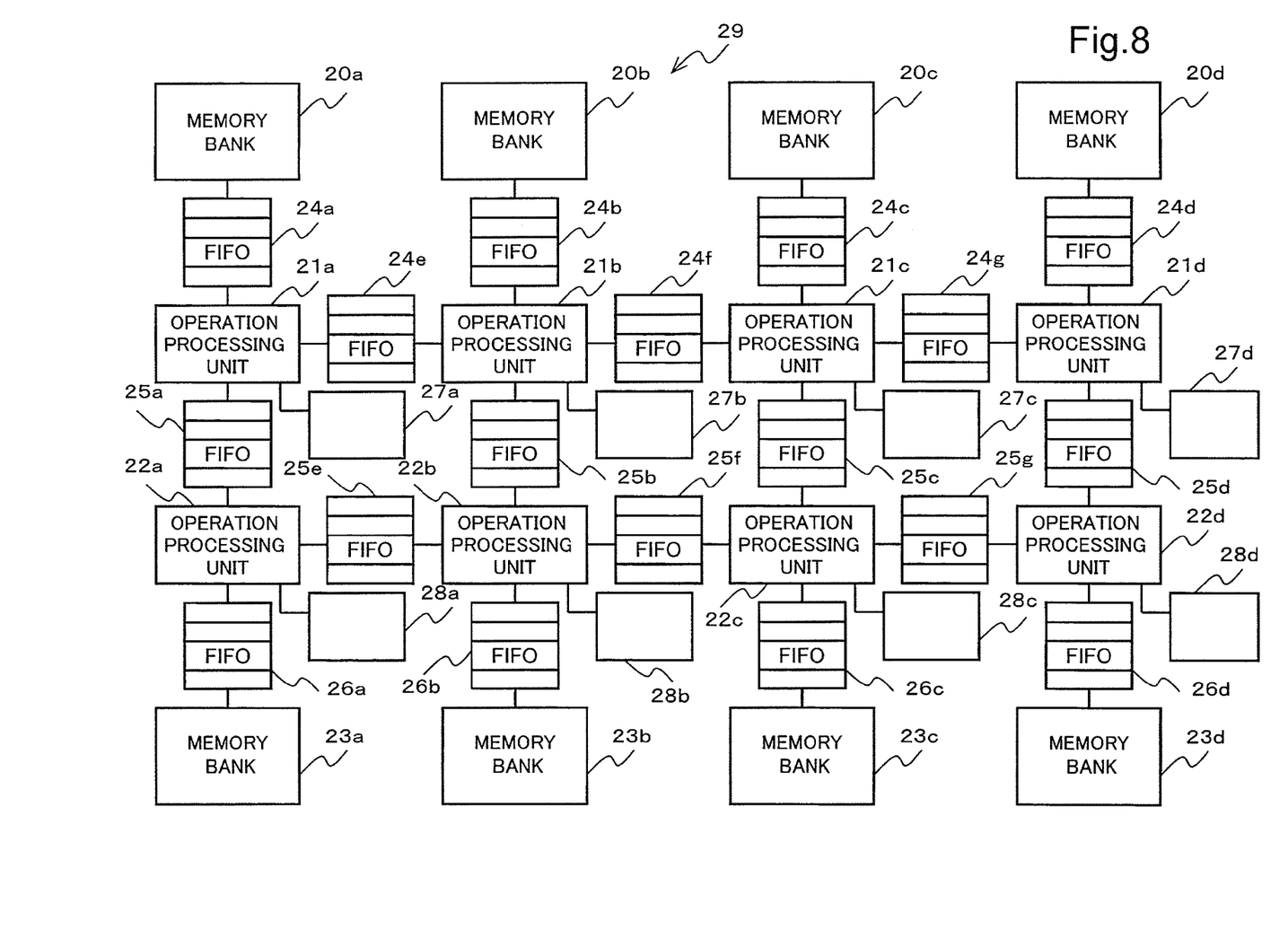
FIG. 8 is a block diagram illustrating a configuration of an array processor equipped with a general synchronization mechanism.

FIG. 8 is a block diagram illustrating an example of a configuration of an array processor 29 using a FIFO (First In First Out) memory as the synchronization mechanism.

As illustrated in FIG. 8, the array processor 29 includes operation processing units 21a to 21d (hereinafter, collectively referred to as an operation processing unit 21) and operation processing units 22a to 22d (hereinafter, collectively referred to as an operation processing unit 22). Further, the array processor 29 includes memory banks 20a to 20d (hereinafter, collectively referred to as a memory bank 20) and memory banks 23a to 23d (hereinafter, collectively referred to as a memory bank 23). Furthermore, the array processor 29 connects inputs/outputs of the operation processing unit 21, the operation processing unit 22, the memory bank 20, and the memory bank 23 via FIFOs 24a to 24g, FIFOs 25a to 25g, and FIFOs 26a to 26d. Hereinafter, the FIFOs 24a to 24g will be collectively referred to as a FIFO 24. In the same manner, the FIFOs 25a to 25g will be collectively referred to as a FIFO 25. The FIFOs 26a to 26d will be collectively referred to as a FIFO 26. The array processor 29 includes synchronization control units 27a to 27d (hereinafter, collectively referred to as a synchronization control unit 27) and synchronization control units 28a to 28d (hereinafter, collectively referred to as a synchronization control unit 28), for synchronizing input/output data. The synchronization control unit 27 and the synchronization control unit 28 control data reaching the memory bank 20, the memory bank 23, the operation processing unit 21, and the operation processing unit 22, by using the FIFO 24, the FIFO 25, and the FIFO 26. The operation processing unit 21 and the operation processing unit 22 enables synchronization control in case that reaching input data is different with respect to each input port, by using the synchronization control unit 27 and the synchronization control unit 28.

Further, as another solving method, there is a technique for introducing an asynchronization control unit for connecting an operation processing unit with a neighboring operation processing unit (refer to, for example, PTL 2). In the technique described in PTL 2, when input data for predetermined operation processing is insufficient, each operation processing unit waits for execution of an operation.

CITATION LIST

Patent Literature

[PTL 1] Japanese Unexamined Patent Application Publication (Translation of PCT Application) No. H4 (1992)-503720
[PTL 2] Japanese Unexamined Patent Application Publication No. S58 (1983)-181168

SUMMARY OF INVENTION

Technical Problem

In the technique described in PTL 1, all connections among the operation processing unit 21, the operation processing unit 22, the memory bank 20, and the memory bank 23 are configured by using switches via the FIFOs 24 to 26. Therefore, the technique described in PTL 1 has a problem of increase in circuit scale with respect to data transfer. Further, the technique described in PTL 1 has a problem of increase in power consumption due to the increase in circuit scale.

In the technique described in PTL 2, since an operation processing unit asynchronously operates, a redundant handshake with respect to data transfer occurs. Therefore, the technique described in PTL 2 has a problem of decrease in operation efficiency of the operation processing unit. Further, the technique described in PTL 2 has a problem of increase in execution time due to the decrease in operation efficiency.

An object of the present invention is to provide a computation device and an operation processing method for solving decrease in operation efficiency, increase in circuit scale, and increase in power consumption, that are the above-described problems.

Solution to Problem

A computation device according to an aspect of the present invention includes: a first data storage unit that stores operation target data; an operation processing unit that executes an operation by using data; a data permutation unit that selects indicated data among the operation target data stored in the first data storage unit and data operated by the operation processing unit, provides predetermined delay for data received a delay indication among the indicated data based on a parameter, does not delay data not received a delay indication executes permutation of indicated data based on a parameter, and outputs data operated in the operation processing unit and operation result data of the operation processing unit; and second data storage unit that stores the operation result data output by the data permutation unit.

A computation method according to an aspect of the present invention includes: storing operation target data; executing an operation by using data; selecting indicated data among the stored operation target data and operated data, providing predetermined delay for data received a delay indication among indicated data based on a parameter, not delaying data not received a delay indication, executing permutation of indicated data based on a parameter, and outputting data to be operated and operation result data; and storing the operation result data.

A computer-readable recording non-transitory medium embodying a program, the program causing a computer to perform a method, the method includes: storing operation target data; executing an operation using data; selecting indicated data among the stored operation target data and operated data, providing predetermined delay for data received a delay indication among indicated data based on a parameter, not delaying data not received a delay indication, executing permutation of indicated data based on a parameter, and outputting data to be operated and operation result data; and storing the operation result data.

Advantageous Effects of Invention

According to the present invention, it is possible to enhance operation efficiency while suppressing increase in circuit scale and in power consumption.

DESCRIPTION OF EMBODIMENTS

Next, exemplary embodiments of the present invention will be described with reference to the drawings.

Each drawing is intended to describe the exemplary embodiments of the present invention. Therefore, the present invention is not limited to the description of each drawing. Further, the same number is assigned to the same component in the respective drawings, and therefore, repetitive description thereof may be omitted.

First Exemplary Embodiment

Figure 1:
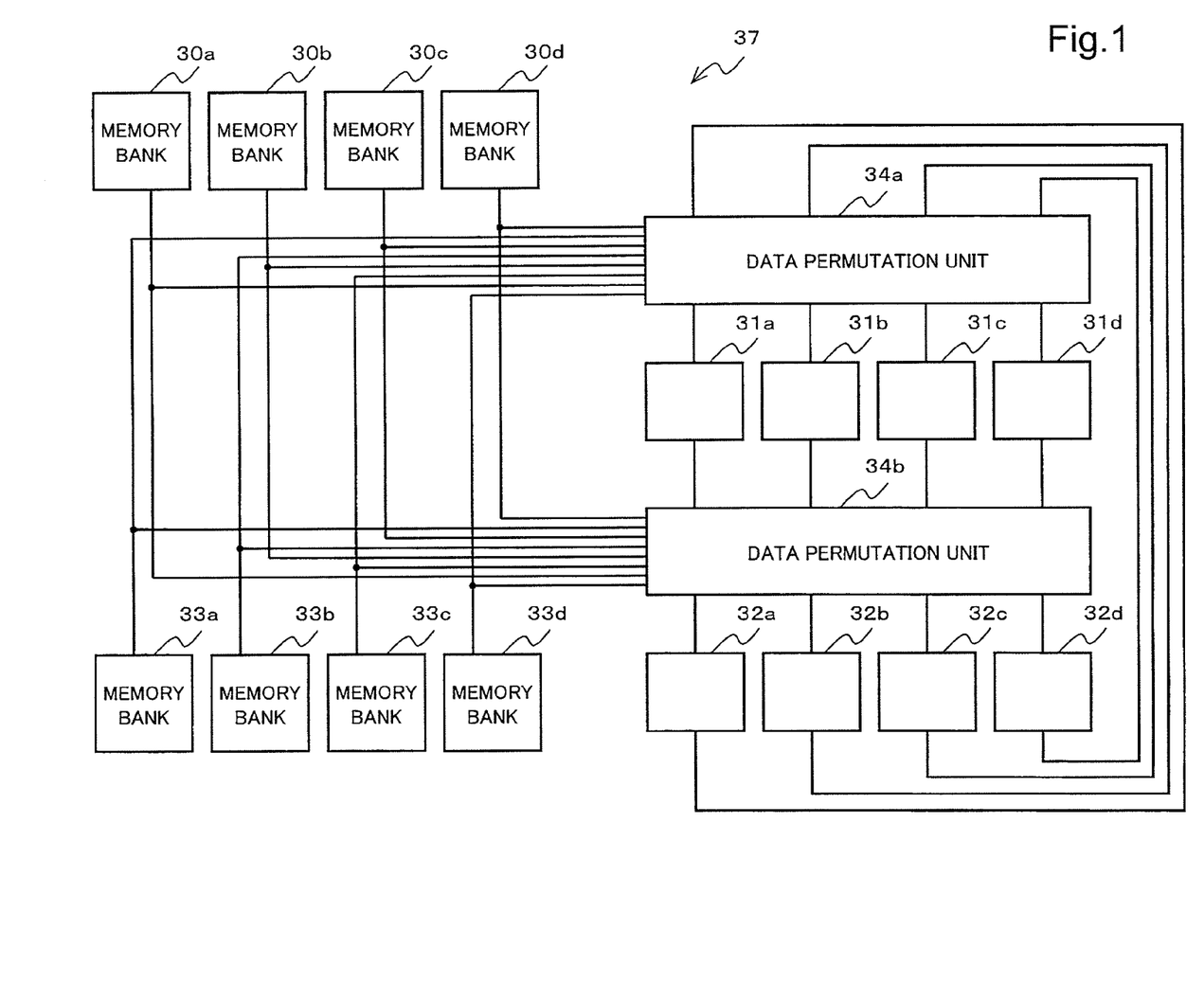
FIG. 1 is a block diagram illustrating an example of a configuration of a computation device according to a first exemplary embodiment of the present invention.

FIG. 1 is a block diagram illustrating an example of a configuration of a computation device 37 according to a first exemplary embodiment of the present invention.

The computation device 37 includes memory banks 30a to 30d, memory banks 33a to 33d, operation processing units 31a to 31d, operation processing units 32a to 32d, and data permutation units 34a to 34b. Hereinafter, the memory banks 30a to 30d will be collectively referred to as a memory bank 30. In the same manner, the memory banks 33a to 33d will be collectively referred to as a memory bank 33. The operation processing units 31a to 31d will be collectively referred to as an operation processing unit 31. The operation processing units 32a to 32d will be collectively referred to as an operation processing unit 32. The data permutation units 34a and 34b will be collectively referred to as a data permutation unit 34.

As illustrated in FIG. 1, the computation device 37 according to the present exemplary embodiment connects the data permutation unit 34a, the operation processing unit 31, the data permutation unit 34b, and the operation processing unit 32 annularly (in a ring-shaped manner).

The memory bank 30 is connected with the data permutation unit 34a and the data permutation unit 34b.

The memory bank 33 is connected with the data permutation unit 34a and the data permutation unit 34b.

The memory bank 30 and the memory bank 33 store operation data. Therefore, the memory bank 30 and the memory bank 33 are also referred to as data storage units. The operation data is data including data to be an operation target (operation target data) and data to be an operation result (operation result data).

The memory bank 30 and the memory bank 33 are not limited to an intended purpose thereof. A partial memory bank of any one of the memory bank 30 and the memory bank 33 may hold operation target data and the remaining memory bank may store operation result data. For example, the memory bank 30 may hold operation target data and the memory bank 33 may hold operation result data. Conversely, the memory bank 33 may hold operation target data and the memory bank 30 may store operation result data. Further, a part of the memory bank 30 and the memory bank 33 may hold operation target data and the remains of the memory bank 30 and the memory bank 33 may store operation result data. Further, the memory bank 30 and the memory bank 33 may hold other data. The memory bank 30 and the memory bank 33 may hold, for example, a parameter to be described later.

In the following, as an example, description is made assuming that the memory bank 30 holds operation target data and the memory bank 33 stores operation result data.

The data permutation unit 34a is connected with the operation processing unit 32 as an anterior stage, the operation processing unit 31 as a posterior stage, the memory bank 30, and the memory bank 33.

The data permutation unit 34b is connected with the operation processing unit 31 as an anterior stage, the operation processing unit 32 as a posterior stage, the memory bank 30, and the memory bank 33.

The data permutation unit 34a supplies either data of a processing result of the operation processing unit 32 as the anterior stage or data in the memory bank 30 to the operation processing unit 31 as the posterior stage connected as an output destination at an appropriate timing. Therefore, the data permutation unit 34a permutes data in a time direction, selects the operation processing unit 31 to be supplied with the data, and supplies the data.

The data permutation unit 34b supplies either data of a processing result of the operation processing unit 31 as the anterior stage or data in the memory bank 30 to the operation processing unit 32 as the posterior stage connected as an output destination at an appropriate timing. Therefore, the data permutation unit 34b permutes data in a time direction, selects the operation processing unit 32 to be supplied with the data, and supplies the data.

A plurality of operation processing units 31 and operation processing units 32 execute an element operation necessary for predetermined operation processing.

The operation processing units 31 and the computation processing units 32 execute, for example, four arithmetic operations, a logical operation, an accumulation, or a power calculation.

However, an operation executed by the operation processing unit 31 and the operation processing unit 32 according to the present exemplary embodiment is not particularly limited.

The operation processing unit 31 is connected with the data permutation unit 34a as an anterior stage and the data permutation unit 34b as a posterior stage. The operation processing unit 31 receives data in the memory bank 30 from the data permutation unit 34a, processes a predetermined operation, and outputs an operation result to the data permutation unit 34b.

The operation processing unit 32 is connected with the data permutation unit 34b as an anterior stage and the data permutation unit 34a as a posterior stage. The operation processing unit 32 receives data in the memory bank 30 and an operation result of the operation processing unit 32 from the data permutation unit 34b, processes a predetermined operation, and outputs an operation result to the data permutation unit 34a.

Hereinafter, the operation processing unit 31 and the operation processing unit 32 will be referred to as a "first operation processing unit" and a "second operation processing unit", respectively, as necessary.

Further, the data permutation unit 34a and the data permutation unit 34b will be referred to as a "first data permutation unit" and a "second data permutation unit", respectively, as necessary.

Next, with reference to the drawings, the data permutation unit 34 will be described in detail.

Figure 2:
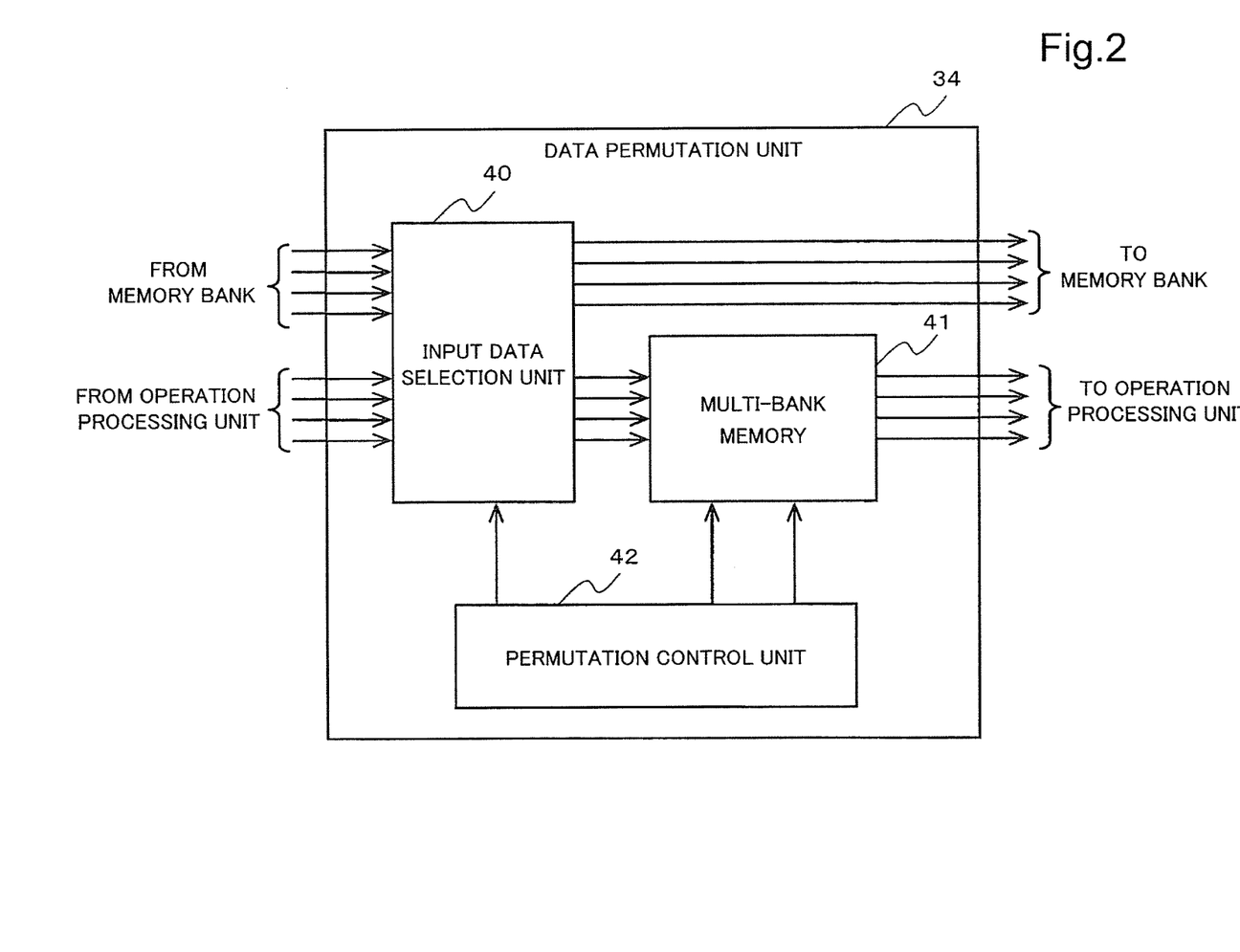
FIG. 2 is a block diagram illustrating an example of a configuration of a data permutation unit according to the first exemplary embodiment.

FIG. 2 is a block diagram illustrating an example of a configuration of the data permutation unit 34.

As illustrated in FIG. 2, the data permutation unit 34 includes an input data selection unit 40, a multi-bank memory 41, and a permutation control unit 42.

The input data selection unit 40 is connected with the memory bank 30, the memory bank 33, an operation processing unit (the operation processing unit 31 or the operation processing unit 32) as the anterior stage, the multi-bank memory 41, and the permutation control unit 42.

The input data selection unit 40 selects an operation processing unit to which input data from the memory bank 30 and input data from the operation processing unit as the anterior stage are output.

For example, the input data selection unit 40 of the data permutation unit 34a selects the operation processing unit 31 to which input data from the memory bank 30 and input data of the operation processing unit 32 as the anterior stage are output.

In the same manner, the input data selection unit 40 of the data permutation unit 34b selects the operation processing unit 32 to which input data from the memory bank 30 and input data of the operation processing unit 31 as the anterior stage are output.

Further, the input data selection unit 40 selects whether or not input data from the operation processing unit as the anterior stage is output to the memory bank 33.

For example, the input data selection unit 40 of the data permutation unit 34a selects whether or not input data from the operation processing unit 32 as the anterior stage is output to the memory bank 33.

In the same manner, the input data selection unit 40 of the data permutation unit 34b selects whether or not input data from the operation processing unit 31 as the anterior stage is output to the memory bank 33.

The multi-bank memory 41 is a multi-port memory including a plurality of ports.

The multi-bank memory 41 illustrated in FIG. 2 includes four ports as the number of ports, which, however, is illustrative. The multi-bank memory 41 according to the present exemplary embodiment may have the number of ports being less than four or the number of ports being more than four.

The multi-bank memory 41 is connected with the input data selection unit 40, the operation processing unit 31 or the operation processing unit 32, and the permutation control unit 42.

The multi-bank memory 41 receives a signal or an indication of write and read timings from the permutation control unit 42. Further, the multi-bank memory 41 receives an indication of a write port and a read port from the permutation control unit 42. The multi-bank memory 41 stores received data, on the basis thereof, permutes the data in an output port direction, and permutes the data in a time direction.

For example, the above operation will be described, by using the multi-bank memory 41 having four ports illustrated in FIG. 2. The port numbers thereof are assumed to be 0, 1, 2, and 3, respectively. It is also assumed that the port numbers (a zeroth port to a third port) correspond to reference signs (a to d) of each configuration, respectively.

The multi-bank memory 41 transmits, for example, data written from the zeroth port to the second port based on the indication. As a result, the multi-bank memory 41 transfers, for example, data from the operation processing unit 31a to the operation processing unit 32c.

Further, for example, the multi-bank memory 41 transmits data written in an N-th cycle, to an (N+4)-th cycle, based on the indication. In this case, the multi-bank memory 41 delays the data by four cycles in the time direction.

The multi-bank memory 41 according to the present exemplary embodiment is not particularly limited as far as being capable of accessing a plurality of banks at the same time. The multi-bank memory 41 may be, for example, a general multi-port memory including a predetermined number of ports and a memory. Further, the multi-bank memory 41 may be a memory device equipped with a crossbar connecting a plurality of memories. Therefore, the multi-bank memory 41 may also be referred to as a "multi-port storage unit".

The permutation control unit 42 is connected with the input data selection unit 40 and the multi-bank memory 41.

The permutation control unit 42 controls at least a selection operation of the input data selection unit 40 and a memory access of the multi-bank memory 41.

A control method of the permutation control unit 42 is not particularly limited. The permutation control unit 42 may transmit, for example, an input data selection signal indicating a selection of input data to the input data selection unit 40. Alternatively, the permutation control unit 42 may transmit a selection command to the input data selection unit 40.

Further, the permutation control unit 42 may transmit a write address and a read address to the multi-bank memory 41. Alternatively, the permutation control unit 42 may transmit a write command and a read command.

Next, an operation of the computation device 37 according to the present exemplary embodiment will be described.

As an assumption of description, target for an operation is data which are read in parallel from the memory bank 30 and are transferred to the operation processing unit 31. It is assumed that a result obtained by being operated by the operation processing unit 31 and the operation processing unit 32 is stored in the memory bank 33.

As operation processing of the computation device 37, the following processing will be described.

(1) A parameter necessary for an operation is stored in the data permutation unit 34 (hereinafter, referred to as a "parameter preloading" step).

(2) Using data stored in the memory bank 30, a predetermined operation is processed by the operation processing unit 31 and the operation processing unit 32, and thereafter, an operation result is written in the memory bank 33 (hereinafter, referred to as a "main operation" step).

Initially, the parameter preloading step of (1) will be described.

Parameters are transferred to the data permutation unit 34 in parallel from the memory bank 30.

The parameters refer to data indicating switching of output ports for data and permutation of the data in a time direction in the multi-bank memory 41, that is, permutation and delay of data.

The parameters may be stored in the memory bank 30 prior to operation processing. For example, a user who executes an operation using the computation device 37 stores the parameters in the memory bank 30 prior to operation processing.

In the present exemplary embodiment, the data permutation unit 34 is connected with the memory bank 30 so that a parameter read from the memory bank 30 can be broadcast and input. Therefore, it is possible that the data permutation unit 34a and the data permutation unit 34b according to the present exemplary embodiment read even data necessary for both units from the memory bank 30 at one time.

The transferred parameters are input to the input data selection unit 40 inside the data permutation unit 34. Then, the input data selection unit 40 selects a necessary parameter based on an input data selection signal generated by the permutation control unit 42. The necessary parameter is stored in a predetermined location of the multi-bank memory 41 in accordance with a write address generated by the permutation control unit 42.

The multi-bank memory 41 executes predetermined delay and permutation of data based on the parameter.

The computation device 37 according to the present exemplary embodiment executes, after termination of the step of (1), processing of the main operation step of (2) for actual operation processing.

Next, the main operation step of (2) will be described.

Initially, operation data is transferred to the data permutation unit 34a in parallel from the memory bank 30.

When the operation data (operation target data) is input to the data permutation unit 34a, the input data selection unit 40 of the data permutation unit 34a selects the input operation data. The input data selection unit 40 stores the operation data in the multi-bank memory 41, by using write addresses generated by the permutation control unit 42 of the data permutation unit 34a. At that time, the permutation control unit 42 counts the number of the generated write addresses and determines a timing for read address generation.

When, for example, four-cycle delay of data transfer, the permutation control unit 42 generates a first read address when the number of counts of write addresses is equal to or more than four. On the basis of such an operation, the permutation control unit 42 realizes predetermined data transfer delay.

When the multi-bank memory 41 stores the operation data, the permutation control unit 42 controls read address generation timings and addresses. On the basis of the operation of the permutation control unit 42, as described above, the operation data is provided with predetermined delay, permuted in a parallel direction, and transferred to the operation processing unit 31 at a predetermined timing.

When the operation data is input to a plurality of operation processing units 31, the operation processing units 31 execute a predetermined operation.

Data of the operation result of the operation processing unit 31 is transferred to the data permutation unit 34b as the posterior stage. When the data of the operation result is input to the data permutation unit 34b, the data permutation unit 34b provides predetermined delay for the input data (operation result), permutes the data in a predetermined parallel direction, and transfers the data to the operation processing unit 32 in the same manner as the data permutation unit 34a.

When the data is transferred, the operation processing unit 32 executes a predetermined operation and transmits the data to the data permutation unit 34a as the posterior stage.

When the data is input from the operation processing unit 32 to the data permutation unit 34a, the permutation control unit 42 of the data permutation unit 34a determines whether or not the input data is a target to be written back in the memory bank 33. The permutation control unit 42, then, supplies an input data selection signal in accordance with the determination to the input data selection unit 40 of the data permutation unit 34a. As a result, the input data is transferred to the memory bank 33.

The computation device 37 can realize a predetermined operation by repeating the above-described processing as many times as the number of data. Each unit of the computation device 37 may execute processing in a pipeline manner.

In the above description, in order to make the description clear, the data permutation unit 34 uses no complex permutation processing. However, the computation device 37 can realize operation processing including complex data transfer (or a connection of an operation processing unit), based on the same operation as in the above description. When, for example, the data permutation unit 34 of the computation device 37 appropriately executes permutation of data, the operation processing unit 31 and the operation processing unit 32 can efficiently execute a predetermined operation while operating cooperatively.

Further, in the above description, each of the operation processing unit 31 and the operation processing unit 32 executes operation processing once.

However, in the computation device 37 according to the present exemplary embodiment, the number of times of processing of the operation processing unit 31 and the operation processing unit 32 is not necessarily limited to one.

The data permutation unit 34, the operation processing unit 31, and the operation processing unit 32 are connected in a ring-shaped manner as illustrated in FIG. 1.

Therefore, the computation device 37 can process an operation having a scale exceeding the number of stages of an operation processing unit, based on the following operation.

Initially, the data permutation unit 34a permutes data in the memory bank 30 as necessary, followed by selecting and transferring the data to the operation processing unit 31.

The operation processing unit 31 processes a predetermined operation and transfers the result to the data permutation unit 34b.

The data permutation unit 34b permutes the data in the memory bank 30 and the operation result of the operation processing unit 31 as necessary, followed by selecting and transferring the data to the operation processing unit 32.

The operation processing unit 32 processes a predetermined operation and transfers the result to the data permutation unit 34a.

In the above description, the data permutation unit 34a selects the processing result of the operation processing unit 32 and transmits the result to the memory bank 33.

However, in this case, the data permutation unit 34a permutes the data in the memory bank 30 and the processing result of the operation processing unit 32 as necessary, followed by selecting and transferring the data to the operation processing unit 31.

When a final operation result is included in the received operation result, the data permutation unit 34a selects the operation result and transfers the result to the memory bank 33. Specifically, the input data selection unit 40 transfers the processing result of the operation processing unit 32 to the memory bank 33, based on an indication of the permutation control unit 43.

The operation processing unit 31 processes a predetermined operation and transfers the result to the data permutation unit 34b.

In the same manner as the last time, the data permutation unit 34b permutes the data in the memory bank 30 and the processing result of the operation processing unit 31 as necessary, followed by selecting and transferring the data to the operation processing unit 32. When a final operation result is included in the received operation result, the data permutation unit 34b transfers the operation result to the memory bank 33.

The computation device 37 repeats the processing until predetermined operation processing ends.

When an operation having a small operation scale such that the number of operations results in one stage is included, the data permutation unit 34b may transfer a final operation result to the memory bank 33 upon receiving a first operation result. In this case, in the same manner as above, the input data selection unit 40 of the data permutation unit 34b transfers the operation result to the memory bank 33.

In this manner, the computation device 37 according to the present exemplary embodiment can realize processing exceeding the number of stages of an operation processing unit.

Further, in the above description, in order to make the description convenient, data selectable by the input data selection unit 40 of the data permutation unit 34 is assumed as data from the memory bank 30 and data from an operation processing unit as the anterior stage. However, the computation device 37 according to the present exemplary embodiment is not limited thereto.

For example, the data permutation unit 34 may receive data from an operation processing unit as the posterior stage in addition to the anterior stage and select the data.

Figure 3:
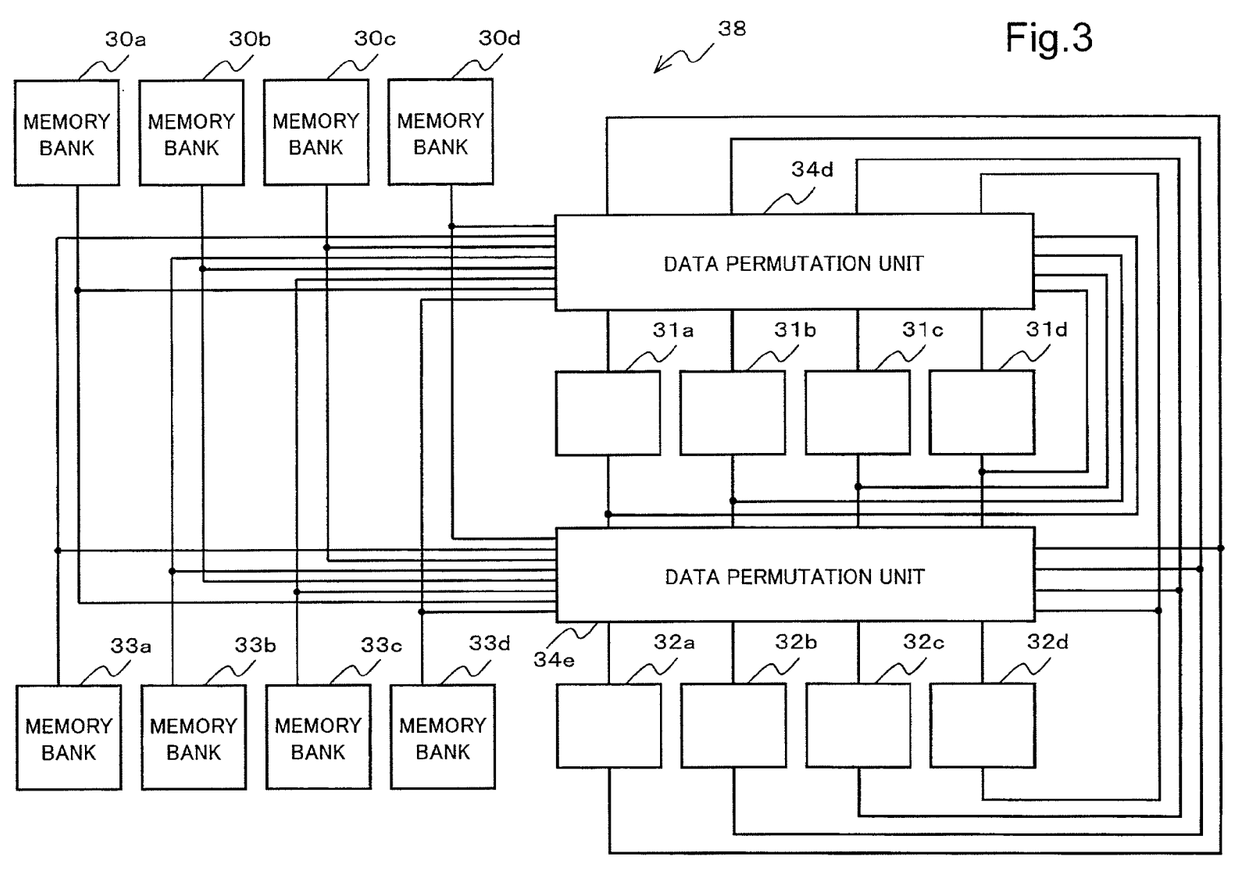
FIG. 3 is a block diagram illustrating an example of another configuration of the computation device according to the first exemplary embodiment.

FIG. 3 is a block diagram illustrating an example of a configuration of a computation device 38 including another configuration of the present exemplary embodiment.

The computation device 38 illustrated in FIG. 3 includes a data permutation unit 34d and a data permutation unit 34e, instead of the data permutation unit 34a and the data permutation unit 34b of the computation device 37 illustrated in FIG. 1 (hereinafter, the data permutation unit 34d and the data permutation unit 34*e* will be collectively referred to as a "data permutation unit 34 of the computation device 38").

The data permutation unit 34 of the computation device 38 is connected with the memory bank 30, the memory bank 33, the operation processing unit 31, and the operation processing unit 32. The data permutation unit 34 of the computation device 38 receives data from the memory bank 30, the operation processing unit 31, and the operation processing unit 32 and selects the data.

The computation device 38 configured in this manner can input an operation result of an operation processing unit as the posterior stage in addition to the memory bank 30 and an operation processing unit as the anterior stage to an operation processing unit. Therefore, the computation device 38 can execute a higher-degree or more efficient operation.

Hereinafter, description will be made as the computation device 37 including the computation device 38, unless otherwise specified.

In the same manner, it is assumed that the data permutation unit 34 includes the data permutation unit 34*d* and the data permutation unit 34*e*.

Further, it is illustrative that the numbers of the memory banks 30, the memory banks 33, the operation processing units 31, and the operation processing units 32, included in the computation device 37 according to the present exemplary embodiment, are set to four. The computation device 37 according to the present exemplary embodiment may include less than four respective components or more than four respective components.

Further, the computation device 37 is not necessarily limited to two in the number of the data permutation units 34. The computation device 37 may include, for example, more than two data permutation units 34.

Figure 4:
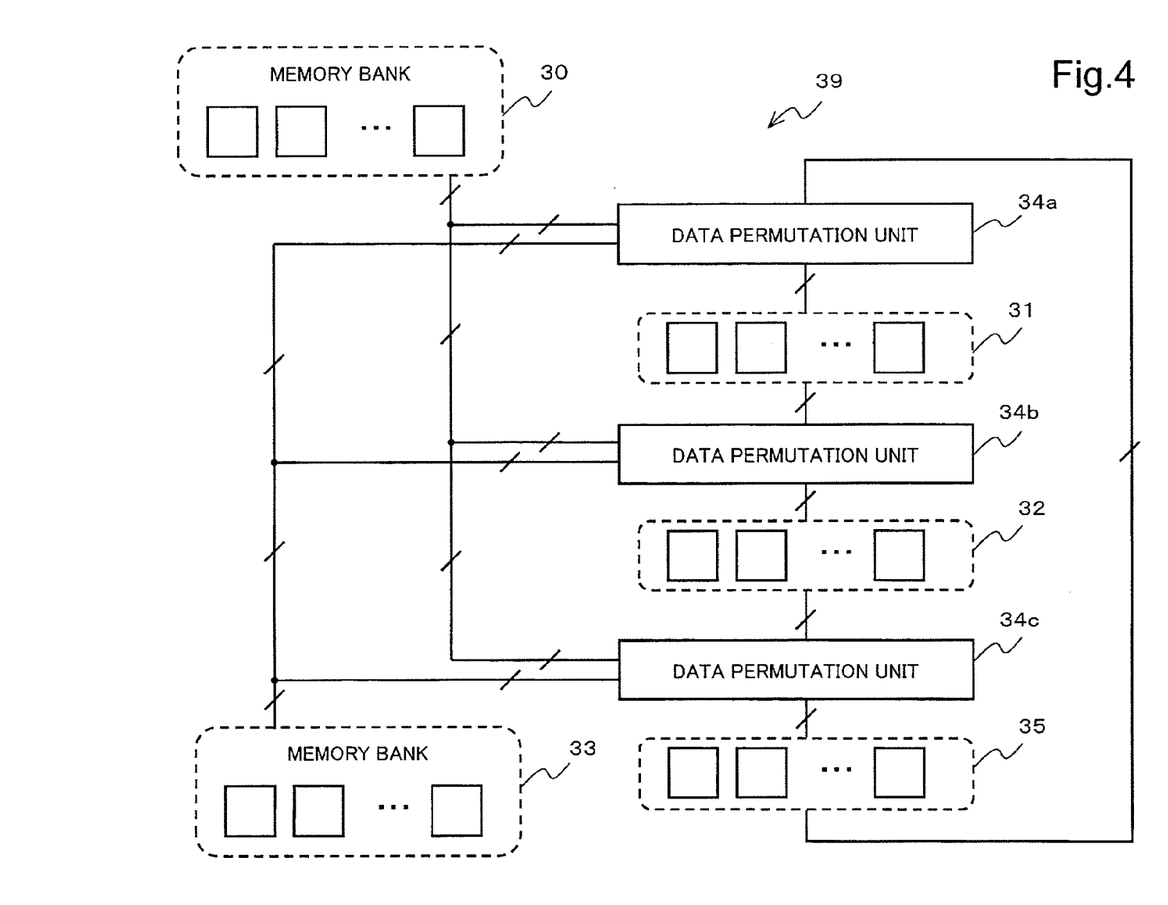
FIG. 4 is a block diagram illustrating an example of other configuration of the computation device according to the first exemplary embodiment.

FIG. 4 is a block diagram illustrating an example of a configuration of a computation device 39 including three data permutation units 34. In FIG. 4, when all connection lines of data are drawn, the figure becomes complicated, and therefore, a line is drawn using a diagonal line indicating a plurality of connection lines.

The computation device 39 includes a data permutation unit 34*a*, a data permutation unit 34*b*, a data permutation unit 34*c*, a memory bank 30, a memory bank 33, an operation processing unit 31, an operation processing unit 32, and an operation processing unit 35.

The data permutation unit 34*c* includes the same components as the data permutation unit 34*b* and operates in the same manner. Therefore, the data permutation unit 34*c* according to the present exemplary embodiment may be referred to as a part of the second data permutation unit.

Further, the operation processing unit 35 includes the same components as the operation processing unit 32 and operates in the same manner. Therefore, the operation processing unit 35 according to the present exemplary embodiment may be referred to as a part of the second operation processing unit.

The operation processing unit 31, the operation processing unit 32, and the operation processing unit 35 can execute operation processing in parallel.

Therefore, the computation device 39 including such components can execute more operation processing in parallel, compared with the computation device 37.

Hereinafter, description will be made as the computation device 37 including the computation device 39, unless otherwise specified. In the same manner, it is assumed that the data permutation unit 34 includes the data permutation unit 34*c*.

Further, the computation device 37 may include one data permutation unit 34.

Figure 5:
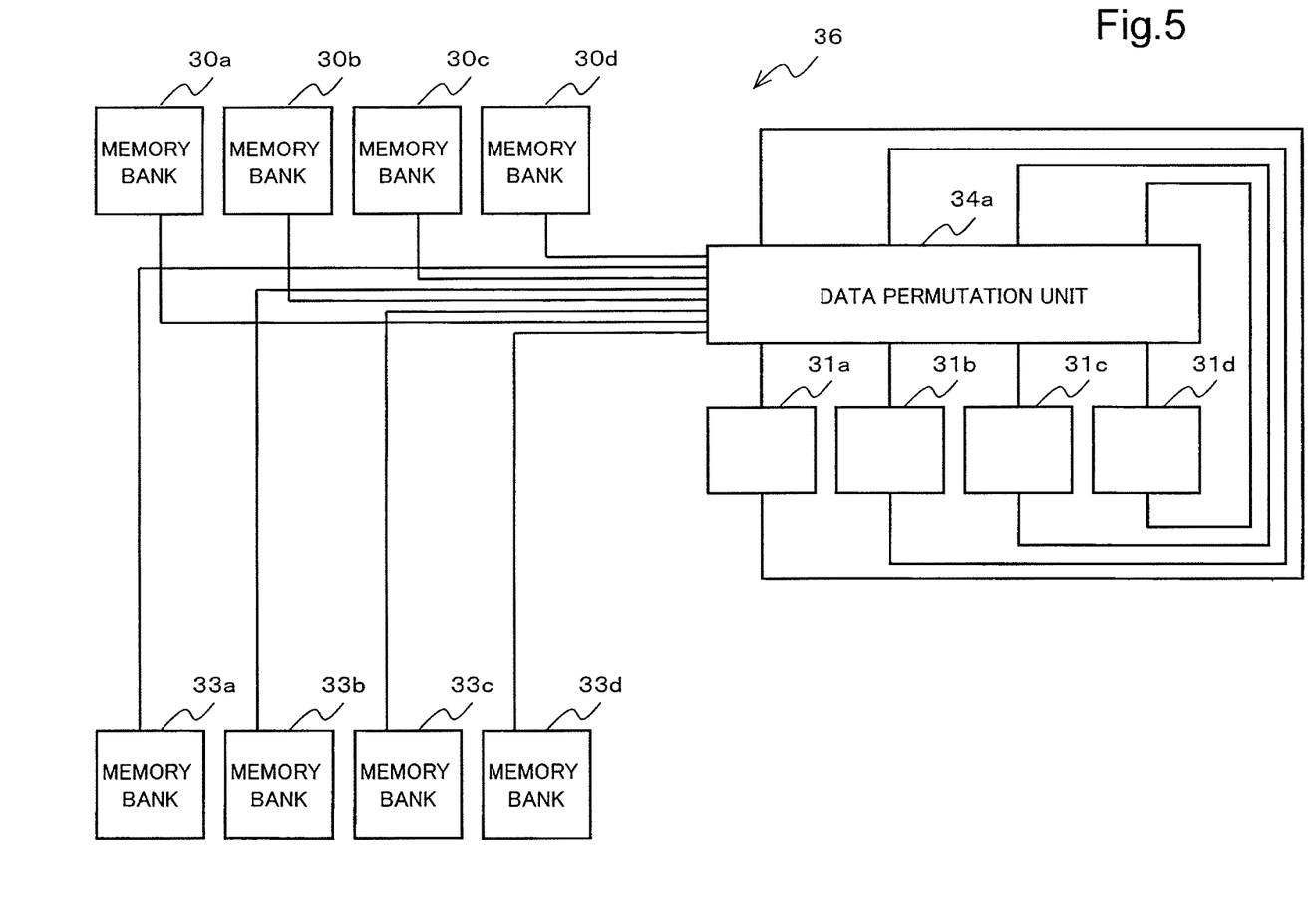
FIG. 5 is a block diagram illustrating an example of other configuration of the computation device according to the first exemplary embodiment.

FIG. 5 is a block diagram illustrating an example of a configuration of a computation device 36 including one data permutation unit 34.

The computation device 36 includes a data permutation unit 34*a*, a memory bank 30, a memory bank 33, and an operation processing unit 31.

The data permutation unit 34*a* of the computation device 36 repeats an operation of the operation processing unit 31 as many times as necessary for the operation.

The computation device 36 is an example of a minimum configuration of the present exemplary embodiment.

Hereinafter, description will be made as the computation device 37 including the computation device 36, unless otherwise specified.

Further, in the computation device 37, the number of anteroposterior operation processing units of the data permutation unit 34 may differ.

Further, in the computation device 37, the number of the memory banks 30 and the memory banks 33 is not necessarily limited to four. The computation device 37 may include less than four or more than four memory banks 30 or memory banks 33. Further, the computation device 37 may include different numbers of the memory banks 30 and the memory banks 33.

In this manner, the computation device 37 according to the present exemplary embodiment can obtain an advantageous effect of enhancing operation efficiency while suppressing increase in circuit scale and power consumption.

The reason is as follows.

The data permutation unit 34 of the computation device 37 performs transfer destination control of data. In other words, in the computation device 37, switches and FIFOs are not necessarily distributed for arrangement. Therefore, the computation device 37 can enhance hardware usage efficiency and suppress increase in circuit scale and power consumption.

Further, the data permutation unit 34 of the computation device 37 is connected with a plurality of memory banks and operation processing units to perform a predetermined permutation. Therefore, the computation device 37 can maintain a configuration of the operation processing units having an appropriate parallelism conforming to a memory bandwidth of the memory banks, and obtain an advantageous effect of enhancing operation efficiency.

Further, the computation device 37 can obtain an advantageous effect of reducing a time for loading parameters.

The reason is as follows.

The data permutation unit 34 of the computation device 37 can receive a parameter necessary for an operation from a memory bank by broadcasting. Therefore, when a plurality of parameters are used, the computation device 37 can receive the parameters at the same time.

Modified Example

The configuration of the computation device 37 is not limited to the above description.

In the computation device 37, for example, at least a part of the memory bank 30, the memory bank 33, the operation processing unit 31, the operation processing unit 32, and the data permutation unit 34 may be a separate device connected via a network or a bus.

Further, in the computation device 37, each component may be divided into a plurality of components.

For example, in the data permutation unit 34, each component may be configured by using a separate device connected via a network or a bus.

Further, in the data permutation unit 34, a plurality of components may be configured as one component.

The data permutation unit 34 may be realized, for example, as a computer including a CPU (Central Processing Unit), a ROM (Read Only Memory), a RAM (Random Access Memory), and an interface circuit (IF).

Figure 6:
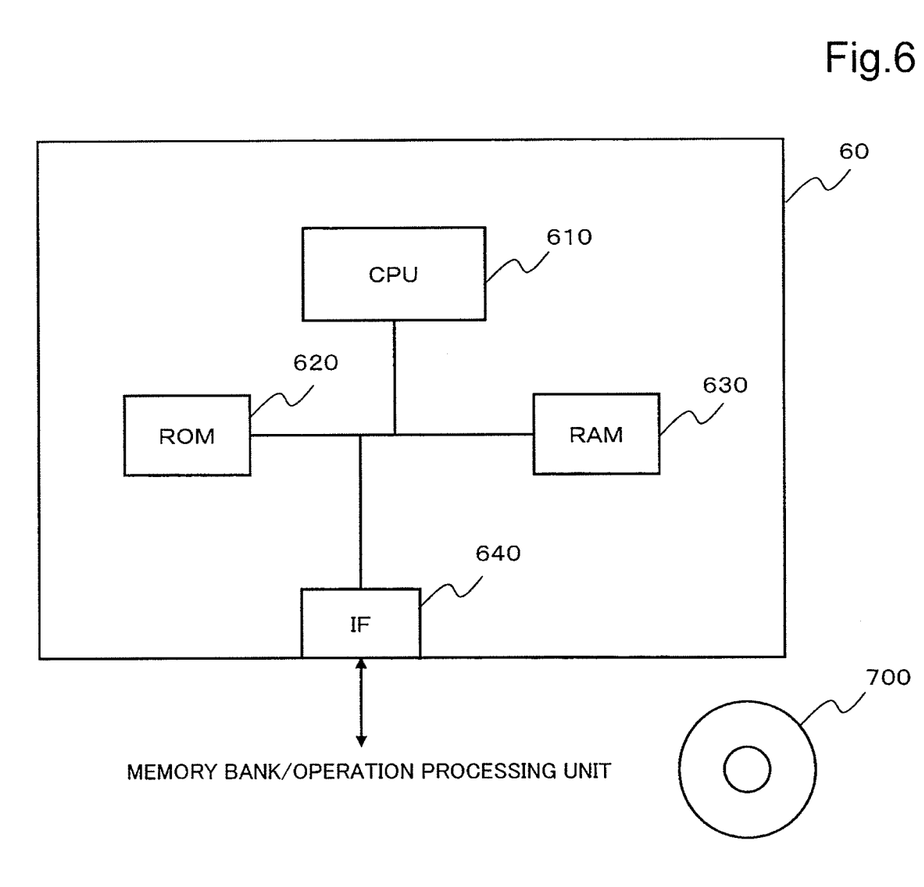
FIG. 6 is a block diagram illustrating an example of a configuration of the data permutation unit according to the first exemplary embodiment.

FIG. 6 is a block diagram illustrating an example of a configuration of a data permutation unit 60 that is another configuration of the present exemplary embodiment.

The data permutation unit 60 configures a computer including a CPU 610, a ROM 620, a RAM 630, and an IF 640.

The CPU 610 reads a program from the ROM 620. The CPU 610 controls the RAM 630 and the IF 640 based on the read program. A computer including the CPU 610 may realize respective functions as the input data selection unit 40, the multi-bank memory 41, and the permutation control unit 42 illustrated in FIG. 2. The CPU 610 uses the RAM 630 as a temporary storage for the program when realizing the respective functions.

The CPU 610 may read a program included in a storage medium 700 storing the program computer-readably, by using a storage medium reading device that is not illustrated. Alternatively, the CPU 610 may receive a program from an external device that is not illustrated via the IF 640.

The ROM 620 stores a program executed by the CPU 610 and fixed data. The ROM 620 is, for example, a P-ROM (Programmable-ROM) or a flash ROM.

The RAM 630 temporarily stores a program executed by the CPU 610 and data. The RAM 630 is, for example, a D-RAM (Dynamic-RAM).

The IF 640 relays data transactions among the memory bank 30, the memory bank 33, the operation processing unit 31, and the operation processing unit 32. The IF 640 is a PCI (Peripheral Component Interconnect) card or a fiber channel card.

The data permutation unit 60 configured in this manner can obtain the same advantageous effect as the data permutation unit 34.

The reason is that the CPU 610 of the data permutation unit 60 can realize the same operation as the data permutation unit 34 based on a program.

Second Exemplary Embodiment

Next, a computation device 37 according to a second exemplary embodiment of the present invention will be described with reference to the drawings.

A configuration of the computation device 37 according to the present exemplary embodiment is the same as the computation device 37 according to the first exemplary embodiment, and therefore, description of the configuration is omitted.

The computation device 37 according to the present exemplary embodiment operates in the same manner as the first exemplary embodiment except that permutation control of the data permutation unit 34 is different. Therefore, description of the same operation is omitted and an operation specific to the present exemplary embodiment will be described.

The input data selection unit 40 according to the first exemplary embodiment selects input data to an operation processing unit as the posterior stage and selects whether or not to output an operation result to a memory bank, based on a signal for selecting input data supplied by the permutation control unit 42 of the data permutation unit 34.

In contrast, the input data selection unit 40 of the data permutation unit 34 according to the present exemplary embodiment inputs input data to the multi-bank memory 41 as it is. However, the input data selection unit 40 according to the present exemplary embodiment includes an arbitration mechanism that arbitrates data input timing in a case when a plurality of data are input to the same bank of the multi-bank memory 41 at the same time occurs.

The arbitration mechanism according to the present exemplary embodiment is not particularly limited. The arbitration mechanism may operate, for example, as follows.

The arbitration mechanism receives data. The arbitration mechanism confirms a state of input of data to be output to an output destination (for example, port) of the received data, that is, whether or not other data to be output is present.

When other data is not input, the arbitration mechanism outputs the received data to the output destination.

When other data is input, the arbitration mechanism outputs data to be output first based on an indication (parameter). After the output data is received by the output destination and the output destination is in a state of receiving next data, the arbitration mechanism outputs remaining data.

Alternatively, the arbitration mechanism according to the present exemplary embodiment may arbitrate data by using a round-robin method and write the data one by one in order in the multi-bank memory 41.

The computation device 37 according to the present exemplary embodiment can obtain an advantageous effect of reducing an operation of the data permutation control unit 42.

The reason is as follows.

Because the input data selection unit 40 according to the first exemplary embodiment generates an input data selection signal, it needs a circuit (mechanism) to hold a parameter necessary for the generation.

On the other hand, the input data selection unit 40 of the computation device 37 according to the present exemplary embodiment includes an arbitration mechanism (circuit) for timings of input data of the multi-bank memory 41.

In general, a scale of a circuit of the arbitration mechanism is smaller than a scale of a circuit for holding a parameter. Therefore, the input data selection unit 40 according to the present exemplary embodiment can be realized with a smaller circuit scale than the input data selection unit 40 according to the first exemplary embodiment.

Third Exemplary Embodiment

Next, a computation device 37 according to a third exemplary embodiment of the present invention will be described with reference to the drawings.

A configuration of the computation device 37 according to the present exemplary embodiment is the same as the computation device 37 according to the first exemplary embodiment, and therefore, description of the configuration is omitted.

The computation device 37 according to the present exemplary embodiment operates in the same manner as the first exemplary embodiment except that permutation control of the data permutation unit 34 is different. Therefore, description of the same operation is omitted and an operation specific to the present exemplary embodiment will be described.

The permutation control unit 42 according to the first exemplary embodiment controls read timings of the multi-bank memory 41 based on a counter of generation of write addresses to the input data permutation unit 40. Based on the control, the permutation control unit 42 generates predetermined delay of operation data transfer.

In contrast, the permutation control unit 42 according to the present exemplary embodiment operates as follows.

The permutation control unit 42 monitors a write address and a read address of the multi-bank memory 41.

The permutation control unit 42 operates for data writing, as follows.

An initial state of the multi-bank memory 41 is a state that none of addresses are written (unwritten).

When a write address is "unwritten", the permutation control unit 42 writes data in the multi-bank memory 41. After writing, the permutation control unit 42 makes the address "written".

When a write address is "written", the permutation control unit 42 stops writing in the multi-bank memory 41 until data on the address is read. After the data on the address is read, the permutation control unit 42 writes data on the address. In this case, the permutation control unit 42 makes the address "written".

On the other hand, the permutation control unit 42 operates for reading, as follows.

When reading on an address of "written", the permutation control unit 42 makes the multi-bank memory 41 output data stored on the read address. After outputting, the permutation control unit 42 makes the address "unwritten".

When reading on an address of "unwritten", the permutation control unit 42 stops reading data until writing on the address is generated (becoming "written"). The permutation control unit 42 reads data after detecting "written". After reading, the permutation control unit 42 makes the address "unwritten".

The permutation control unit 42 may set "unwritten/written" after confirming presence or absence of writing on the address, instead of setting "unwritten" after reading data.

Based on such an operation, the permutation control unit 42 realizes permutation of data in the multi-bank memory 41 in a time direction and in an output (port) direction.

The computation device 37 according to the present exemplary embodiment can obtain an advantageous effect of making control easy, compared with the computation device 37 according to the first exemplary embodiment.

The reason is as follows.

The permutation control unit 42 of the computation device 37 according to the present exemplary embodiment monitors a write address and a read address of the multi-bank memory 41 and performs control based on the addresses. Therefore, the permutation control unit 42 does not need to consider a timing of a memory access in writing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-281060, filed on Dec. 25, 2012, the disclosure of which is incorporated herein in its entirety by reference.

The whole or part of the exemplary embodiments disclosed above can be described as, but not limited to, the following supplementary notes.

(Supplementary Note 1)

A computation device includes:

a first data storage unit that stores operation target data;

an operation processing unit that executes an operation by using data;

a data permutation unit that selects indicated data among the operation target data stored in the first data storage unit and data operated by the operation processing unit, provides predetermined delay for data received a delay indication among the indicated data based on a parameter, does not data not received a delay indication, executes permutation of indicated data based on a parameter, and outputs data operated in the operation processing unit and operation result data of the operation processing unit; and second data storage unit that stores the operation result data output by the data permutation unit.

(Supplementary Note 2)

The computation device according to supplementary note 1 includes:

a plurality of the data permutation unit; and a plurality of the operation processing unit, wherein the data permutation unit selects the indicated data among the operation target data and the operation result data of one or at least two operation processing unit.

(Supplementary Note 3)

The computation device according to supplementary note 1 or 2, wherein the data permutation unit comprising:

an input data selection unit that receives data, selecting indicated data, and outputting the data to the second data storage unit or the operation processing unit;

a multi-port storage unit that receives data from the input data selection unit, providing delay for data received a delay indication based on the parameter, not delaying data not received a delay indication, executing an indicated permutation based on the parameter, and outputting the data from a predetermined output port; and a permutation control unit that controls the input data selection unit and the multi-port storage unit.

(Supplementary Note 4)

The computation device according to supplementary note 3, wherein the input data selection unit confirms whether or not other data with a same output destination as input data is present, outputs the input data when other data is absent, and outputs remaining data, after any data is output and the output destination is receivable again, when other data is present.

(Supplementary Note 5)

The computation device according to supplementary note 3 or 4, wherein the permutation control unit monitors a read address and a write address of the multi-port storage unit and when receiving a read indication, reads data from the read address when an address of the read indication is written and, stops reading until data is written on the read address when an address of the read indication is unwritten.

(Supplementary Note 6)

A computation method includes:

storing operation target data;

executing an operation by using data;

selecting indicated data among the stored operation target data and operated data, providing predetermined delay for data received a delay indication among indicated data based on a parameter, not delaying data not received a delay indication, executing permutation of indicated data based on a parameter, and outputting data to be operated and operation result data; and storing the operation result data.

(Supplementary Note 7)

A computer-readable recording non-transitory medium embodying a program, the program causing a computer to perform a method, the method includes:

storing operation target data;

executing an operation using data;

selecting indicated data among the stored operation target data and operated data, providing predetermined delay for data received a delay indication among indicated data based on a parameter, not delaying data not received a delay indication, executing permutation of indicated data based on a parameter, and outputting data to be operated and operation result data; and storing the operation result data.

INDUSTRIAL APPLICABILITY

The present invention is applicable to processing in which an array processor is useful, that is, a signal processing application such as a matrix operation, filtering processing, and data permutation.

REFERENCE SINGS LIST

10 Memory bank
11 Operation processing unit
12 Operation processing unit
13 Memory bank
14 Array operation unit
15 Operation processing unit
16 Multi-bank
17 Data memory
19 Array processor
20 Memory bank
21 Operation processing unit
22 Operation processing unit
23 Memory bank
24 FIFO
25 FIFO
26 FIFO
27 Synchronization control unit
28 Synchronization control unit
29 Array processor
30 Memory bank
31 Operation processing unit
32 Operation processing unit
33 Memory bank
34 Data permutation unit
35 Operation processing unit
36 Computation device
37 Computation device
38 Computation device
39 Computation device
40 Input data selection unit
41 Multi-bank memory
42 Permutation control unit
60 Data permutation unit
610 CPU
620 ROM
630 RAM
640 IF
700 Storage medium

The invention claimed is:

1. A computation device comprising:

a first data storage unit that stores operation target data;

an operation processing unit that executes an operation by using data;

a data permutation unit that selects indicated data among the operation target data stored in the first data storage unit and data operated by the operation processing unit, provides predetermined delay for data that has received a delay indication among the indicated data based on a parameter, does not delay data that has not received a delay indication, executes permutation of indicated data based on a parameter, and outputs data operated in the operation processing unit and operation result data of the operation processing unit; and second data storage unit that stores the operation result data output by the data permutation unit, wherein the data permutation unit comprises:

an input data selection unit that receives data, selecting indicated data, and outputting the data to the second data storage unit or the operation processing unit;

a multi-port storage unit that receives data from the input data selection unit, providing delay for data received a delay indication based on the parameter, not delaying data not received a delay indication, executing an indicated permutation based on the parameter, and outputting the data from a predetermined output port; and a permutation control unit that controls the input data selection unit and the multi-port storage unit.

2. The computation device according to claim 1, further comprising:

a plurality of the data permutation unit; and a plurality of the operation processing unit, wherein the data permutation unit selects the indicated data among the operation target data and the operation result data of the plurality of the operation processing unit.

3. The computation device according to claim 1, wherein the input data selection unit confirms whether or not other data with a same output destination as input data is present, outputs the input data when other data is absent, and outputs remaining data, after any data is output and the output destination is receivable again, when other data is present.

4. The computation device according to claim 1, wherein the permutation control unit monitors a read address and a write address of the multi-port storage unit, and when receiving a read indication, reads data from the read address when an address of the read indication is written and, stops reading until data is written on the read address when an address of the read indication is unwritten.

5. A computation method comprising:

storing operation target data;

executing an operation by using data;

selecting indicated data among the stored operation target data and operated data, providing predetermined delay for data that has received a delay indication among indicated data based on a parameter, not delaying data that has not received a delay indication, executing permutation of indicated data based on a parameter, and outputting data to be operated and operation result data; and storing the operation result data, wherein the selecting comprises receiving data, selecting indicated data, and outputting the data;

wherein the providing comprises receiving the outputted data and providing delay for data that has received a delay indication based on the parameter and not delaying data that has not received a delay indication;

wherein the executing comprises executing an indicated permutation based on the parameter, and outputting the data from a predetermined output port; and wherein the method further comprises controlling the selecting, the providing, and the executing.

6. A computer-readable recording non-transitory medium embodying a program, the program causing a computer to perform a method, the method comprising:

storing operation target data;

executing an operation using data;

selecting indicated data among the stored operation target data and operated data, providing predetermined delay for data that has received a delay indication among indicated data based on a parameter, not delaying data that has not received a delay indication, executing permutation of indicated data based on a parameter, and outputting data to be operated and operation result data; and storing the operation result data, wherein the selecting comprises receiving data, selecting indicated data, and outputting the data;

wherein the providing comprises receiving the outputted data and providing delay for data that has received a delay indication based on the parameter and not delaying data that has not received a delay indication;

wherein the executing comprises executing an indicated permutation based on the parameter, and outputting the data from a predetermined output port; and wherein the method further comprises controlling the selecting, the providing, and the executing.

* * * * *

UNITED STATES PATENT AND TRADEMARK OFFICE
CERTIFICATE OF CORRECTION

PATENT NO. : 9,507,541 B2
APPLICATION NO. : 14/654876
DATED : November 29, 2016
INVENTOR(S) : Tomoyoshi Kobori It is certified that error appears in the above-identified patent and that said Letters Patent is hereby corrected as shown below:

In the Specification

Column 6, Line 4: Delete "computation" and insert --operation--

Column 10, Line 25: Delete "43." and insert --42.--

Column 15, Line 4: Delete "permutation" and insert --selection--

Column 16, Line 10: After "not", insert --delay--

Signed and Sealed this
Fifth Day of December, 2017

Joseph Matal
*Performing the Functions and Duties of the
Under Secretary of Commerce for Intellectual Property and
Director of the United States Patent and Trademark Office*